(12) United States Patent
Studer

(10) Patent No.: US 7,465,144 B1
(45) Date of Patent: Dec. 16, 2008

(54) ADJUSTABLE WINCH AND PULLEY SYSTEM

(76) Inventor: Ronald M. Studer, 1820 E. Mansfield St., Bucyrus, OH (US) 44820

( * ) Notice: Subject to any disclaimer, the term of this patent is extended or adjusted under 35 U.S.C. 154(b) by 192 days.

(21) Appl. No.: 11/036,681

(22) Filed: Jan. 14, 2005

Related U.S. Application Data

(60) Provisional application No. 60/536,747, filed on Jan. 15, 2004.

(51) Int. Cl.
*B60P 1/54* (2006.01)

(52) U.S. Cl. .................................. 414/542; 414/541

(58) Field of Classification Search ................ 414/450, 414/496, 541, 542
See application file for complete search history.

(56) References Cited

U.S. PATENT DOCUMENTS

| | | | | |
|---|---|---|---|---|
| 2,182,956 A | * | 12/1939 | Beyerline | 474/34 |
| 4,546,891 A | * | 10/1985 | Lanigan et al. | 212/327 |
| 4,627,119 A | * | 12/1986 | Hachey et al. | 5/85.1 |
| 4,715,762 A | * | 12/1987 | Lanigan et al. | 414/798.1 |
| 5,062,760 A | * | 11/1991 | Samaniego | 414/542 |
| 5,114,295 A | * | 5/1992 | Jansson | 414/460 |
| 5,350,076 A | * | 9/1994 | Kalan | 212/315 |
| 5,539,941 A | * | 7/1996 | Fuller | 5/85.1 |
| 5,715,958 A | * | 2/1998 | Feider et al. | 212/273 |
| 5,743,702 A | * | 4/1998 | Gunderson | 414/542 |
| 6,099,232 A | * | 8/2000 | Dixon et al. | 414/494 |
| 6,196,367 B1 | * | 3/2001 | Hanabusa et al. | 192/3.54 |
| 6,394,247 B1 | * | 5/2002 | Monahan et al. | 192/41 S |
| 6,511,275 B2 | * | 1/2003 | Ray | 414/11 |
| 6,659,497 B1 | * | 12/2003 | Owens | 280/656 |
| 2004/0187390 A1 | * | 9/2004 | Celani | 49/360 |
| 2005/0100422 A1 | * | 5/2005 | Clive-Smith | 410/14 |

FOREIGN PATENT DOCUMENTS

WO     WO 02/28748 A1 * 4/2002

OTHER PUBLICATIONS

Anne H. Soukhanov and Kaethe Ellis, editors. Webster's II New Riverside University Dictionary, 1984, Hoffman Mifflin Company, p. 95.*

* cited by examiner

*Primary Examiner*—Charles A Fox
(74) *Attorney, Agent, or Firm*—Pearne & Gordon LLP

(57) ABSTRACT

Provided is a lifting system. The lifting system consists of pulleys mounted to moveable, perpendicular shafts that allow the pulleys to be adjustably positioned in horizontal plane. In this way the pulleys can be properly positioned to lift a variety of loads. The system may be powered either manually or by a motor. Further provided is a lifting system, comprising a track and a lifting carriage movable along said track, said lifting carriage including a pulley, a drive shaft for turning said pulley, a support shaft, and a slide assembly connecting said drive shaft to said support shaft, wherein said slide assembly is movable along said drive shaft and the support shaft.

27 Claims, 13 Drawing Sheets

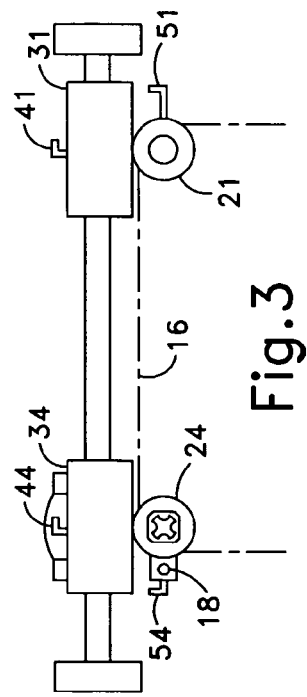
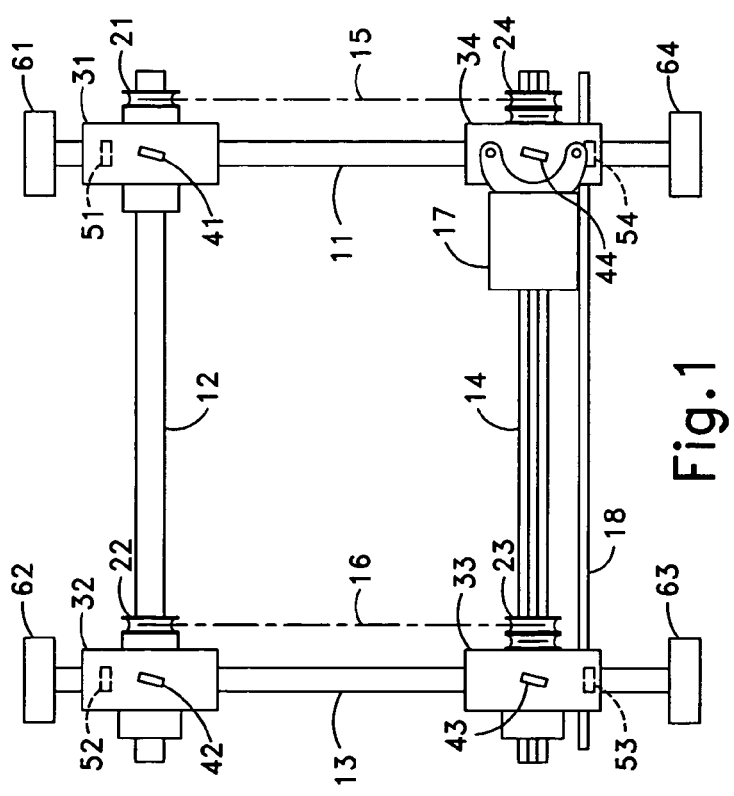
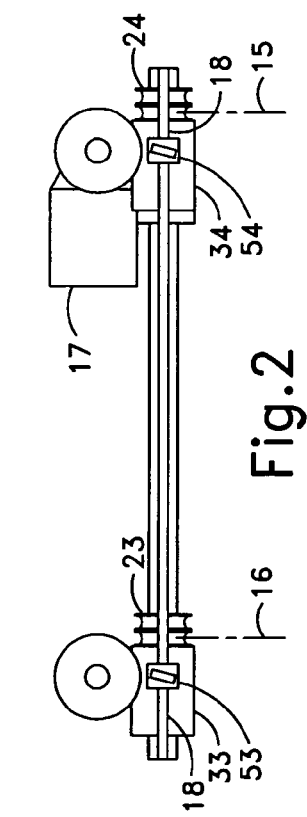

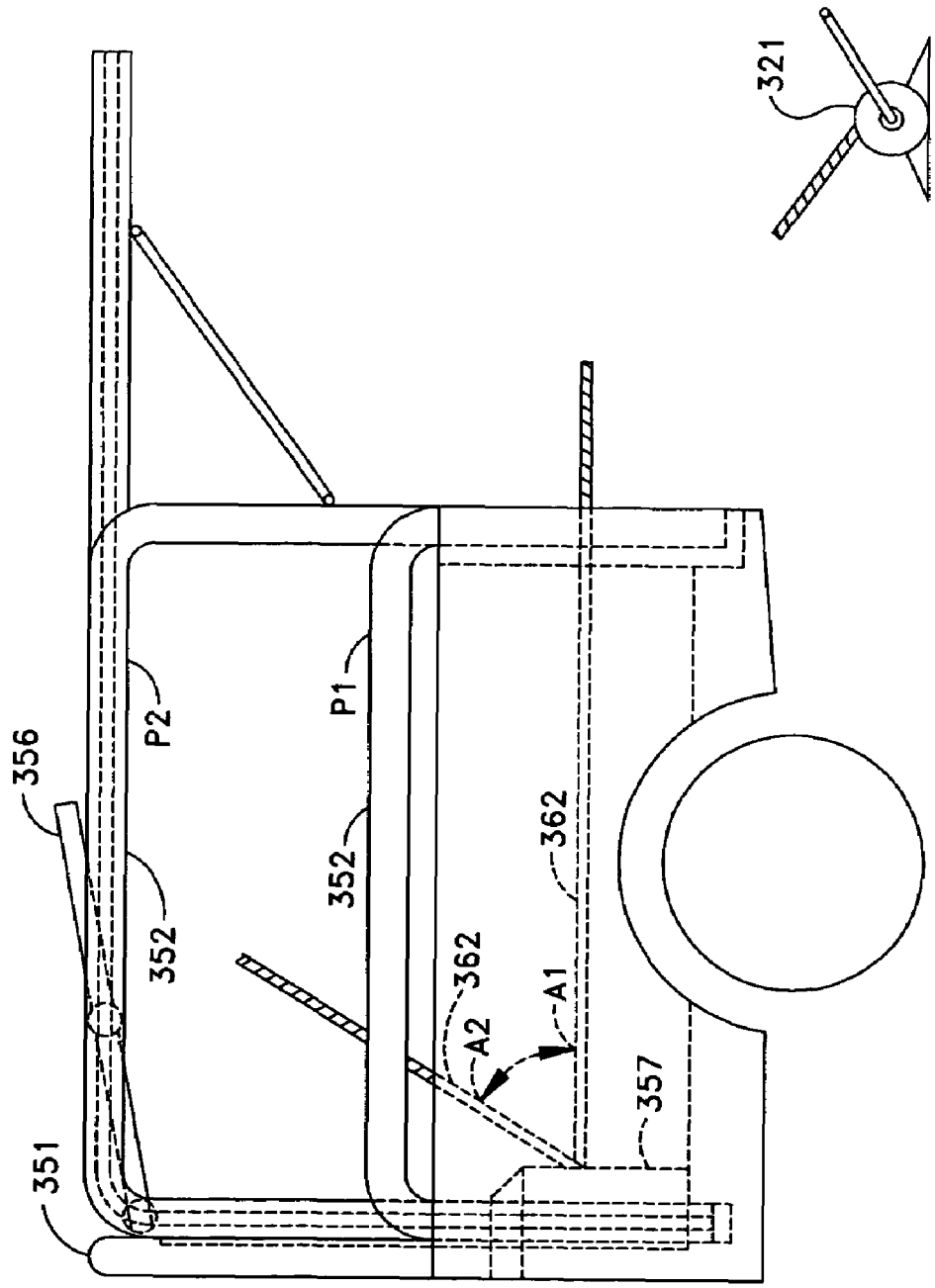

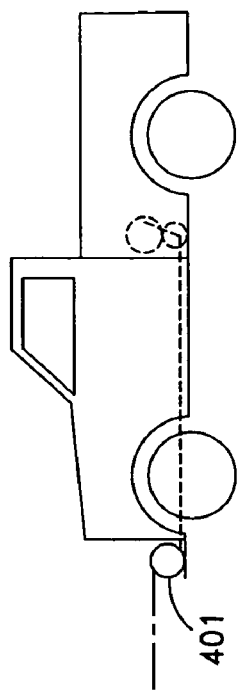
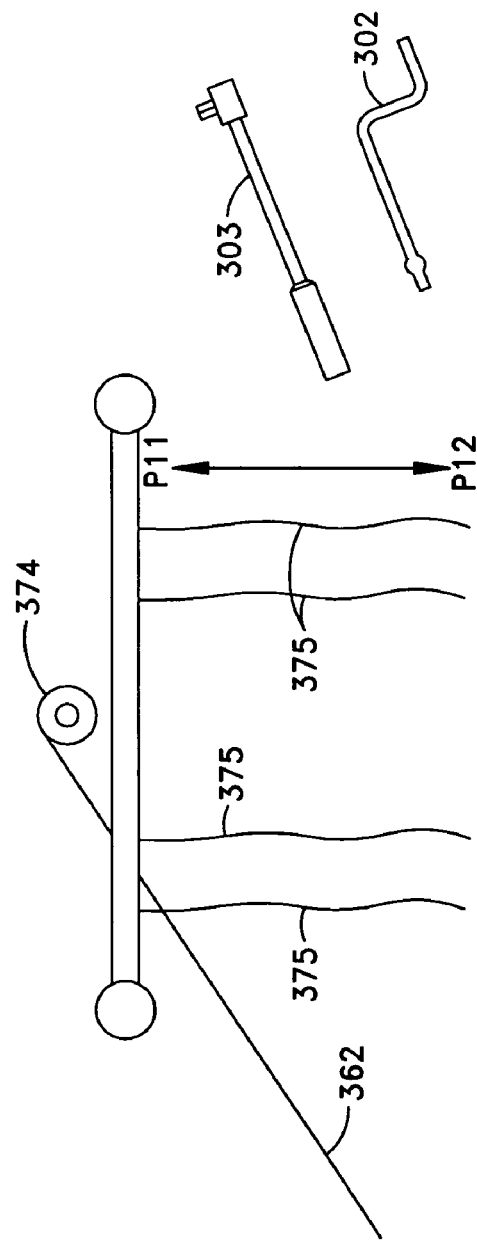
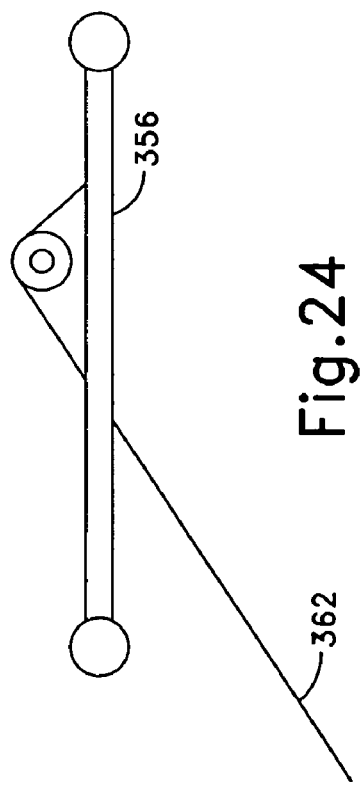

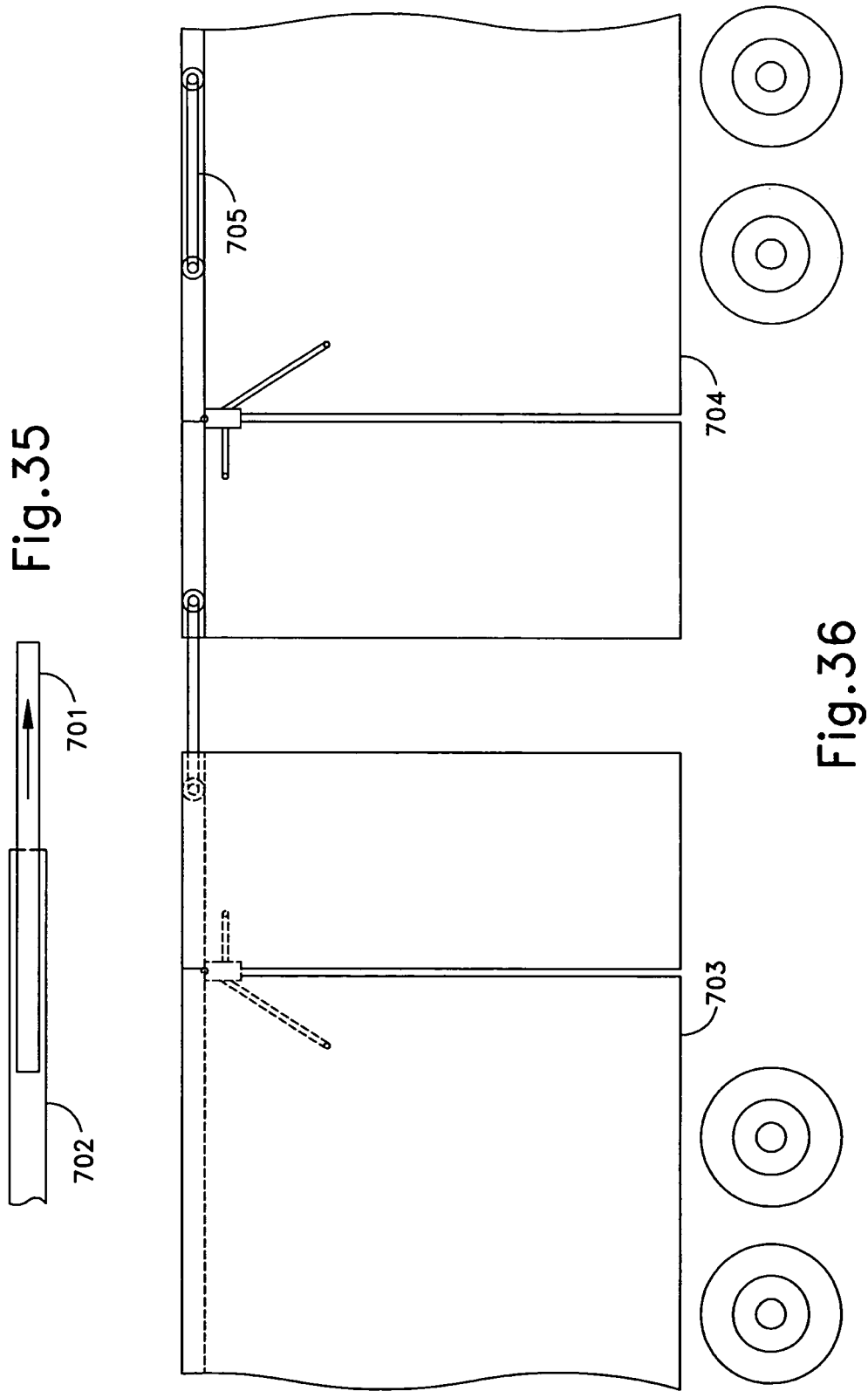

ADJUSTABLE WINCH AND PULLEY SYSTEM

STATEMENT OF RELATED APPLICATIONS

This application claims the benefit of provisional patent application Ser. No. 60/536,747 filed Jan. 15, 2004, incorporated herein by reference.

FIELD OF THE INVENTION

This application relates generally to an adjustable winch and pulley system.

More specifically, this application relates to a winch and pulley system designed to be installed in a fixed location, for example, within a building, or on a mobile device, for example, on a truck bed.

BACKGROUND OF THE INVENTION

The need exists for an inexpensive, easy-to-use winch and pulley system to facilitate the lifting and moving of heavy objects by a single individual, and which may be adopted to a variety of installations. Crane or hoist systems currently used in buildings are generally not adaptable for use in vehicles or trailers. Gantry cranes require hard, level surfaces and are not suitable for use in a vehicle. Girder cranes also require a building's structure and cannot be adapted for vehicle use. Furthermore, these systems are often expensive to install.

A winch and pulley system installable on a vehicle or trailer would obviate the need to accommodate the use of heavy tow motors. For example, the floor structure of current semi tractor-trailers must be designed to withstand loading by tow motors. This need would be eliminated if the trailer contained its own hoist system. Also, tow motor use would be reduced, adding safety to the workplace. A truck having a self-contained winch and pulley system could allow a single driver to pick-up and deliver heavier packages than is currently possible. Also, the system could be used to secure loads during transport.

SUMMARY OF THE INVENTION

Provided is a lifting system, comprising a track and a lifting carriage movable along said track, said lifting carriage including a pulley, a drive shaft for turning said pulley, a support shaft, and a slide assembly connecting said drive shaft to said support shaft, wherein said slide assembly is movable along said drive shaft and the support shaft.

Further provided is a lifting system, comprising a drive shaft, a support shaft, a first spacing shaft, a second spacing shaft, a first slide assembly for connecting said support shaft to said first spacing shaft and which is positionable along said first spacing shaft, a second slide assembly for connecting said support shaft to said second spacing shaft and which is positionable along said second spacing shaft, a third slide assembly for connecting said drive shaft to said second spacing shaft and which is positionable along said second spacing shaft, a fourth slide assembly for connecting said drive shaft to said first spacing shaft and which is positionable along said first spacing shaft, a driven pulley positionable along said drive shaft wherein said drive shaft causes said driven pulley to rotate, a support pulley positionable along said support shaft, and a windable support which extends between said driven pulley and said support pulley.

Further provided is a lifting system mounted on a vehicle, comprising a first track movable from a stowed position to a deployed position on the vehicle, a second track movable from a stowed position to a deployed position on the vehicle, and a lifting carriage movable along said first track and said second track, said lifting carriage including a support shaft and a slide assembly.

BRIEF DESCRIPTION OF THE DRAWINGS

FIG. 1 is a plan view of an adjustable winch and pulley system;

FIG. 2 is a side section view of the system shown in FIG. 1;

FIG. 3 is an end section view of the system shown in FIG. 1;

FIG. 19 is a section view of an alternative embodiment of the winch and pulley system installed in the bed of a pickup truck and utilizing modified bed rails and a roll bar to act as a track system;

FIG. 20 shows a manually operated boat winch that could provide power to the system shown in FIG. 19;

FIG. 24 is a section view showing single or multiple cables run from a vehicle bed-mounted winching system, placed directly over pulleys on the lifting carriage;

FIG. 25 is a section view showing single or multiple cables from a vehicle bed-mounted winching system pre-wound on a drum and hand crank or ratcheting tools for powering the winching apparatus and pre-winding the drum;

FIG. 26 is a section view showing a bed-mounted winching system used with an attached device to supply a frontward pull to the vehicle;

FIG. 35 shows an alternative method of track extension;

FIG. 36 shows two semi tractor-trailers, back-to-back, with interconnected tracks;

DETAILED DESCRIPTION OF THE PREFERRED EMBODIMENTS

Figure 6:
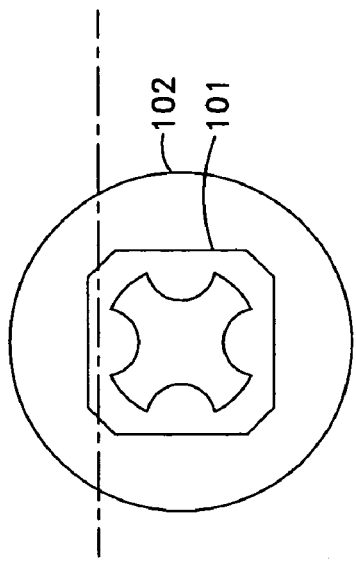
FIG. 6 is a section view of the inner and outer pulley pieces that would be located on the drive shaft of the winch and pulley system.

An adjustable lifting system is described herein. The system is comprised of a lifting carriage which is moveable or positionable along one or more tracks. The system may be installed in a building or on a mobile device such as a truck or trailer.

The lifting carriage is adjustable so that loads of various sizes may be handled by the system. The lifting carriage is comprised of shafts and slide assemblies. By adjusting the relative spacing of the shafts through the use of the slide assemblies, various sized loads may be raised and lowered. The system could be installed on a vehicle to facilitate the handling of cargo.

To lift a load, a user would move the lifting carriage along the tracks to a desired position for lifting. The lifting carriage could either be moved manually or by motor. The user could then adjust the size of the lifting carriage, in order to accommodate the load, by sliding the various shafts along or through the slide assemblies. When the lifting carriage is suitably sized, the user could then lower supports from the lifting carriage, which would be used to raise the load. The supports, for example, could be attached to the load directly or to a platform on which the load sits.

To raise the load, the user would activate a drive means, for example, a motor or manually powered winch, which would wind the supports and lift the load. Once raised, the user could then move the load laterally by causing the lifting carriage to move along the tracks. The user could then lower the load to a desired location. If the winch and pulley system were installed on a truck or other vehicle, the user could use the system to load or unload cargo from the vehicle. Track extensions could be deployed by the user to extend the length of the tracks, should the user wish to extend the range of movement available to the lifting carriage.

FIGS. 1, 2 and 3 represent a current embodiment of the adjustable lifting system, for example an adjustable winch and pulley system. The lifting system is designed to move on a first wheel 61, a second wheel 62, a third wheel 63, and a fourth wheel 64 along the track or tracks. The track, for example, could be comprised of a channel or a rail. Accordingly, the system is positionable along the tracks.

A first support shaft 11, a second support shaft 12, a third support shaft 13, and a drive shaft 14 support a first pulley wheel 21, a second pulley wheel 22, a third pulley wheel 23, and a fourth pulley wheel 24. The support shafts 11, 12, 13 and drive shaft 14 are adjustable in the horizontal plane for the purpose of positioning the four pulley wheels 21, 22, 23, 24. The drive shaft 14 is powered by a winch motor 17 and drives two pulleys 23, 24.

A first slide assembly 31 couples the first support shaft 11 to the second support shaft 12. A second slide assembly 32 couples the second support shaft 12 to the third support shaft 13. A third slide assembly 33 couples the third support shaft 13 to the drive shaft 14. A fourth slide assembly 34 couples the drive shaft 14 to the first support shaft 11. The slide assemblies 31, 32, 33, 34 can be constructed as two hollow tubes placed over and at right angles to each other. This results in opposite support shafts, for example the second support shaft 12 and the drive shaft 14, being located in substantially the same horizontal plane. The tubes may include optional internal bearings to allow for easier movement of the support shafts 11, 12, 13, and the drive shaft 14.

The first slide assembly 31 has a first slide lock 41 and a second slide lock 51. The second slide assembly 32 has a third slide lock 42 and a fourth slide lock 52. The third slide assembly 33 has a fifth slide lock 43 and a sixth slide lock 53. The fourth slide assembly 34 has a seventh slide lock 44 and an eighth slide lock 54. The slide locks 41, 42, 43, 44, 51, 52, 53, 54 prevent movement of the support shafts 11, 12, 13 and the drive shaft 14 through the slide assemblies 31, 32, 33, 34 and are designed to allow the shafts 11, 12, 13, 14 and slide assemblies 31, 32, 33, 34 to be positioned and repositioned to lift loads of various sizes. For example, the slide locks 41, 42, 43, 44, 51, 52, 53, 54 could be formed of L-shaped pieces of steel rod with threaded ends which can be fastened to the slide assemblies 31, 32, 33, 34, for example, screwed into tapped holes on the slide assemblies 31, 32, 33, 34. Alternatively, the slide locks 41, 42, 43, 44, 51, 52, 53, 54 could be comprised of clamps, locking pins, locking tabs, or other locking devices as may exist in the art.

The first slide lock 41 and seventh slide lock 44 engage the first support shaft 11. The second slide lock 51 and fourth slide lock 52 engage the second support shaft 12. The third slide lock 42 and fifth slide lock 43 engage the third support shaft 13. The sixth slide lock 53 and eighth slide lock 54 engage a locking rod 18. By tightening the slide locks 41, 42, 43, 44, 51, 52, 53, 54, the position of the pulley wheels 21, 22, 23, 24 and slide assemblies 31, 32, 33, 34 may be fixed.

A first winching cable 15 engages the first pulley wheel 21 and fourth pulley wheel 24 for raising and lowering loads when the winching motor 17 is energized. Similarly, a second winching cable 16 engages the second pulley wheel 22 and third pulley wheel 23. In addition to using cables, other support devices capable of being wound, that is, windable supports, could be utilized. For example, windable supports could include ropes, braided materials, chains, unstranded wires, flexible synthetic materials, cables, and the like.

Figure 5:
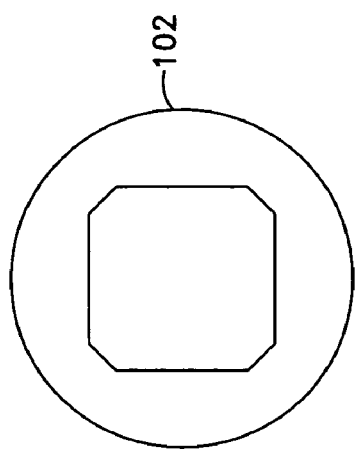
FIG. 5 is a section view of an outer piece of the pulley wheel that would be located on the drive shaft of the winch and pulley system.
Figure 4:
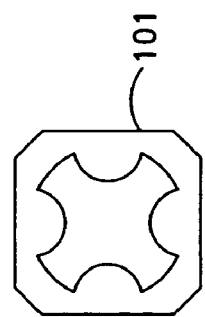
FIG. 4 is a section view of an inner piece of a pulley wheel that would be located on the drive shaft of the winch and pulley system.

FIGS. 4, 5, and 6 show components of the pulley wheels 23, 24. Each has an inner core 101 that engages the drive shaft 14 and an outer wheel 102 that surrounds the inner core and engages the winching cables 15, 16. This configuration allows the outer wheel 102 to be removed from the inner core 101 for manual rotation to adjust the length of the winching cables 15, 16. The cable length of each pulley wheel 21, 22, 23, 24 may be adjusted independently of each other without rotating the drive shaft 14.

The first pulley wheel 21 and second pulley wheel 22 may be attached to the first slide assembly 31 and second slide assembly 32, respectively, by a mechanical means such as screw, bolt, rivet, or clamp, for example. Additionally, they may be secured by a more permanent means such as welding, brazing, or gluing, for example. In an alternative embodiment, the first pulley wheel 21 and second pulley wheel 22 may be connected to their slide assemblies via brackets.

Figure 8:
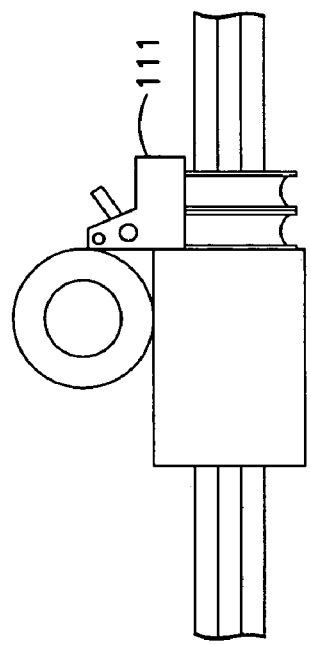
FIG. 8 is a left side view of the pulley wheel with shroud shown in FIG. 7.
Figure 7:
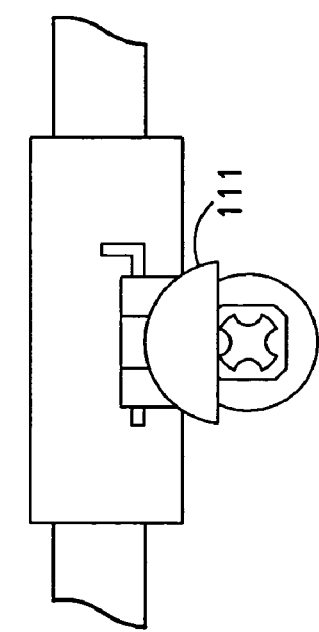
FIG. 7 is a section view showing a shroud covering the pulley wheel.

FIGS. 7 and 8 show a pulley wheel shroud 111. The third pulley wheel 23 and fourth pulley wheel 24 are both driven by the drive shaft 14 and may include the pulley wheel shroud 111. Its purpose is to prevent the winching cables 15, 16 from slipping off of their corresponding pulleys. As can be seen in FIG. 7, the rim of the pulley wheel shroud 111 is situated to hang over the inner core 101, which keeps the third pulley wheel 23 adjacent to the third slide assembly 33 and fourth pulley 24 adjacent to the fourth slide assembly 34 during operation and adjustment. The pulley wheel shroud 111 preferably quick-connects to and from its operating position, for example, through the use of a press-release tab or a twist-lock mechanism.

The first pulley wheel 21 and second pulley wheel 22 may or may not have internal bearings. They may be mounted as an integral part of their corresponding slide assembly, or they may free float in a manner similar to the third pulley wheel 23 and fourth pulley wheel 24.

Figure 10:
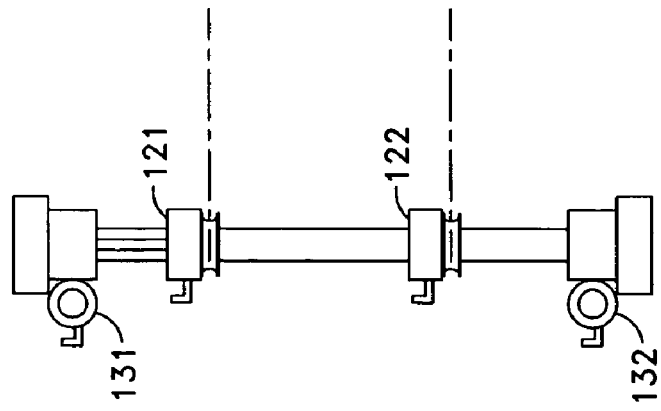
FIG. 10 is an end section view of the system shown in FIG. 9.
Figure 9:
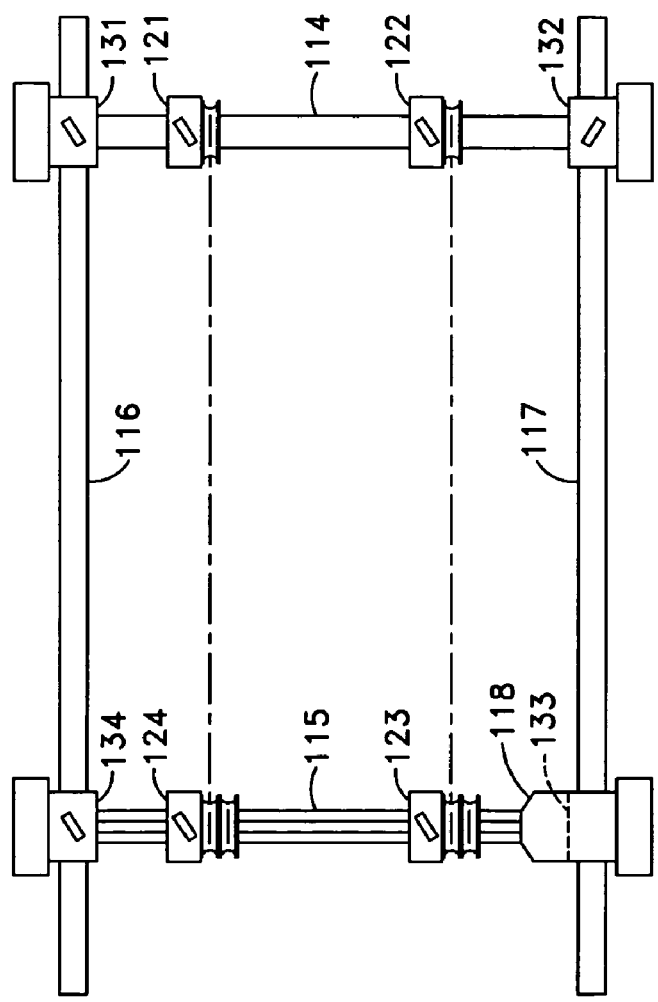
FIG. 9 is a plan view of an alternative embodiment of the adjustable winch and pulley system in which the motor position is fixed.

FIGS. 9 and 10 show a further embodiment of the adjustable winch and pulley system. A first pulley wheel 121 and a second pulley wheel 122 are supported by a support shaft 114. The first and second pulley wheels 121, 122 are non-driven support pulleys. A third pulley wheel 123 and a fourth pulley wheel 124 are supported by a drive shaft 115 and are driven pulleys. The first and second pulley wheels 121, 122 slide and lock on the support shaft 114, while the third and fourth pulley wheels 123, 124 slide and lock on the drive shaft 115. A first spacing shaft 116 and a second spacing shaft 117 allow for adjustment of the relative positions of the support shaft 114 and the drive shaft 115. A first slide assembly 131 couples the support shaft 114 to the first spacing shaft 116. A second slide assembly 132 couples the support shaft 114 to the second spacing shaft 117. A third slide assembly 133 couples the drive shaft 115 to the second spacing shaft 117. A fourth slide assembly 134 couples the drive shaft 115 to the first spacing shaft 116.

In this embodiment, the slide assemblies 131, 132, 133, 134 remain in a fixed position adjacent to the wheels of the lifting carriage. Also, the winching motor 118 remains in a fixed position, allowing for the addition of a gearbox, if desired. A gearbox could allow for powered movement of the lifting carriage.

Figure 11:
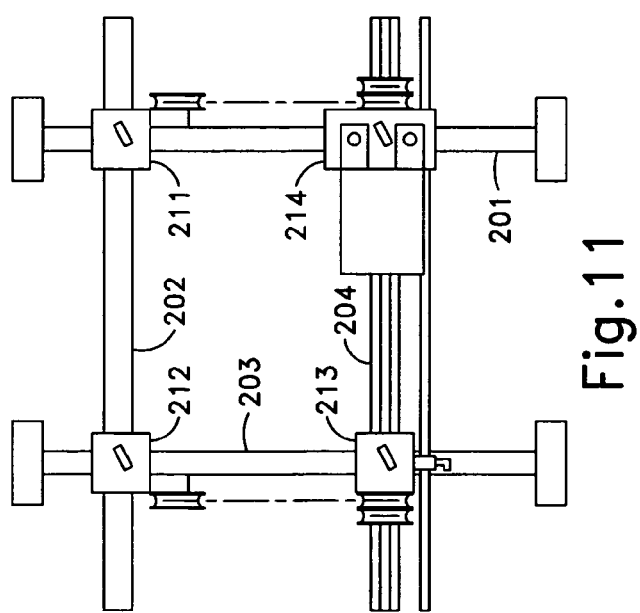
FIG. 11 is a plan view of an alternative embodiment of the adjustable winch and pulley system utilizing primarily square steel tubing.
Figure 13:
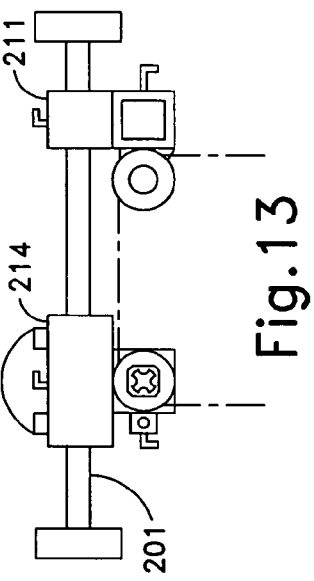
FIG. 13 is an end section view of the system shown in FIG. 11.
Figure 12:
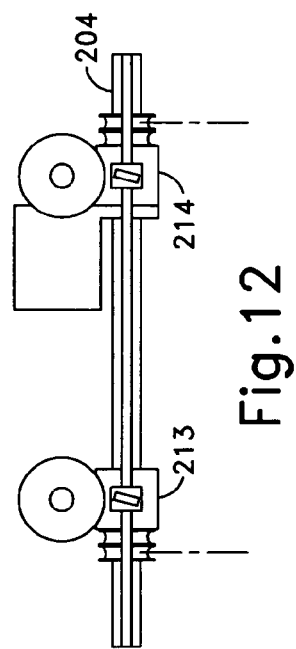
FIG. 12 is a side section view of the system shown in FIG. 11.

FIGS. 11, 12, and 13 show a further embodiment of the winch and pulley system. A first support shaft 201, a second support shaft 202, and a third support shaft 203 are comprised of square steel tubing. Likewise, a first slide assembly 211 and a second slide assembly 212 are comprised of square steel tubing. The first slide assembly 211 couples the first support shaft 201 to the second support shaft 202. The second slide assembly 212 couples the second support shaft to the third support shaft 203. A third slide assembly 213 couples the third support shaft 203 to a drive shaft 204. A fourth slide assembly 214 couples the first support shaft 201 to the drive shaft 204. The third and fourth slide assemblies 213, 214, which house the drive shaft 204, could include bearings. However, bearings may excluded from the first and second slide assemblies 211, 212.

Figure 15:
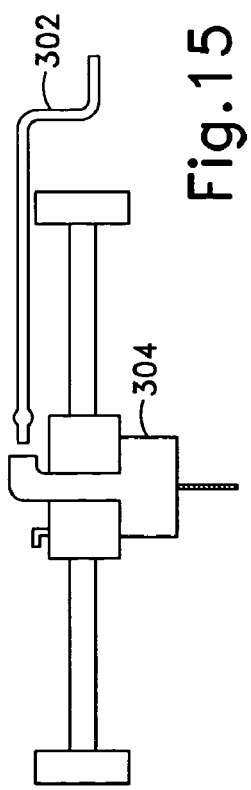
FIG. 15 is a section view of an alternative embodiment of the winch and pulley system that is driven by the hand crank and has a single slide assembly.
Figure 16:
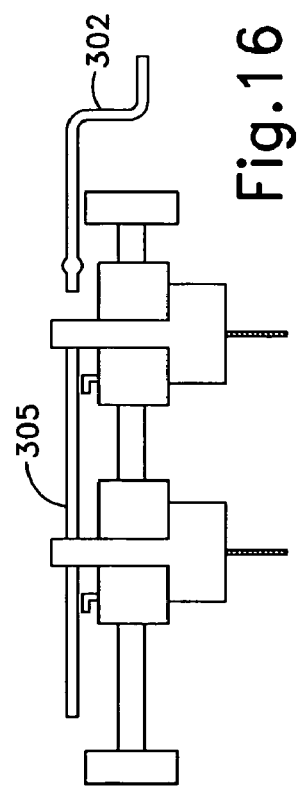
FIG. 16 is a section view of an alternative embodiment of the winch and pulley system that is driven by the hand crank with a pair of slide assemblies and coupled to operate in unison.
Figure 22:
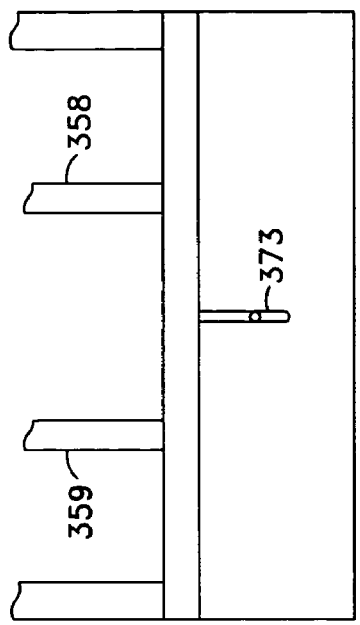
FIG. 22 is a section view of the system shown in FIG. 21.
Figure 23:
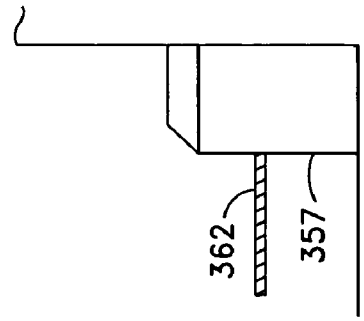
FIG. 23 is a side view of FIG. 19.
Figure 21:
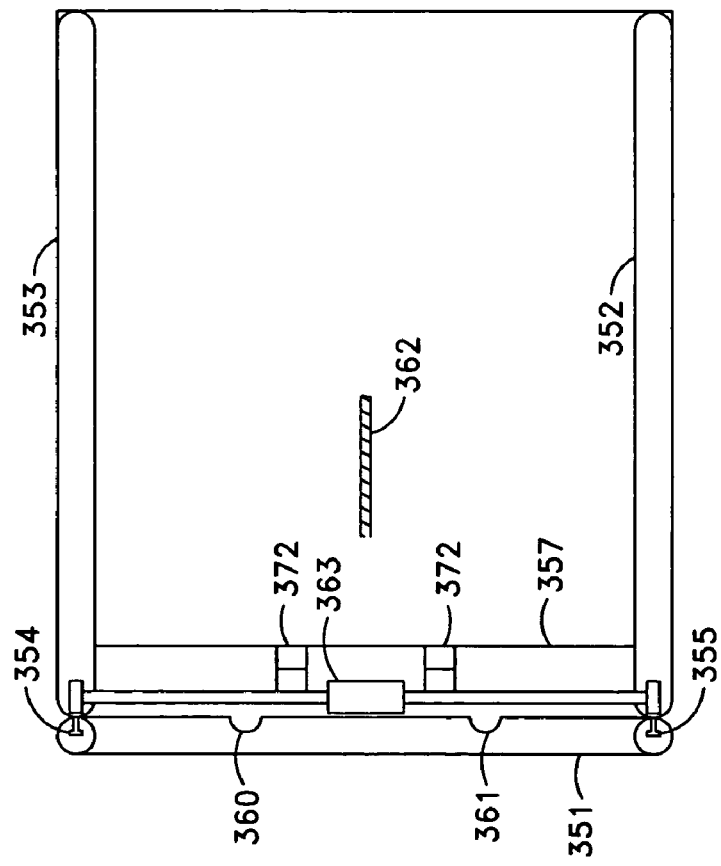
FIG. 21 is a plan view of the system shown in FIG. 19.

FIGS. 14, 15, 16 and 18 show a manually operated embodiment of the winch and pulley system. A hand crank 302 or a ratcheting wrench 303, for example, a ⅜ or ½ inch ratcheting wrench, is inserted into a gearbox 301 and turned by hand to drive the system. The gearbox 301 may be considered to be similar to those used to raise and lower spare tires on vehicles as may exist in the art. For a system with a single gearbox, shown in FIG. 14, the gearbox may be used to drive one or a plurality of pulleys. FIG. 15 shows a single pulley system with a single hand cranked gearbox 304. FIG. 16 shows a two-pulley system that includes two gearboxes. A shaft 305 connects the two driving gearboxes for simultaneous operation. Alternatively, the shaft 305, could be eliminated, and the gearboxes driven independently. In addition to a hand crank 302 or a ratcheting wrench 303, an electric drill, such as a cordless drill, for example, could be inserted into the gearbox 301 and operated to drive the system, or a fixed motor could be coupled to the gearbox 301 to drive the system.

Figure 17:
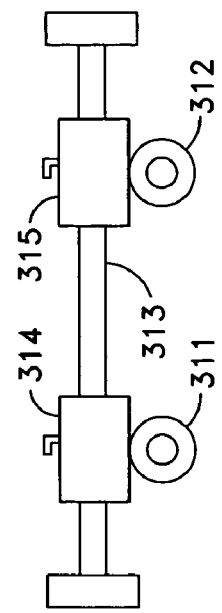
FIG. 17 is a section view of an alternative embodiment having eyebolts instead of winches and pulleys.
Figure 18:
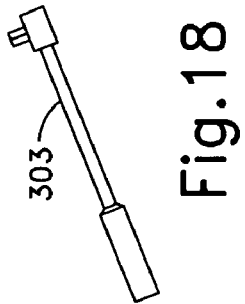
FIG. 18 is a ratcheting wrench that may be substituted for the hand crank in alternative embodiments.
Figure 14:
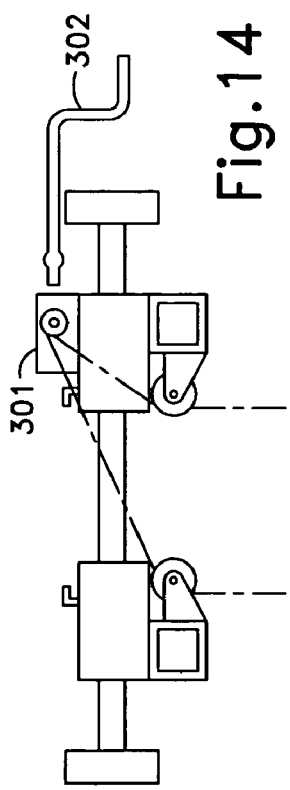
FIG. 14 is a section view of an alternative embodiment of the winch and pulley system that is driven by a hand crank.

FIG. 17 shows a system in which the driven pulleys have been replaced with eyebolts 311, 312. A support shaft 313 supports a first slide assembly 314 and a second slide assembly 315. A first eyebolt 311 extends from the first slide assembly 314. A second eyebolt 312 extends from the second slide assembly 315. Come along winches, ratcheting winches, or separate pulleys, for example, may be attached to the eyebolts to hoist objects.

FIGS. 19 through 25 show an embodiment of the winch and pulley system installed in the bed of a pickup truck having a roll bar 351, a first bed rail 352 on the driver's side of the bed and a second bed rail 353 on the passenger's side of the bed. The winch and pulley system could be installed on a vehicle having a bed or not having a bed or on a trailer. The roll bar 351 and bed rails 352, 353 are modified to act as a track system for the winch and pulley system. The first bed rail 352 and second bed rail 353 are vertically adjustable from a storage position P1 to an operating position P2. Both bed rails 352, 353 have T-nuts 354, 355 attached to them that slide through slots in the roll bar 351 as the bed rails are raised and lowered, keeping the bed rails sturdy and in proper alignment for lifting.

The lifting carriage 356 pictured at the top of the raised bed rails 352, 353 may be considered to be either moving into a position for lifting or to be moving into a position for storage. When in storage, the lifting carriage may be placed at least partially in a storage unit, for example, a storage box 357, which may be mounted to the bed of the truck. A first shaft 358 of the lifting carriage 356 and a second shaft 359 of the lifting carriage 356 are stored in a substantially vertical position with one end in the storage box 357 and the other end inserted into slots 360, 361 in the roll bar 351. Because of the ease of assembly and disassembly of the winch and pulley system, it is not necessary to store the first shaft 358 and second shaft 359 of the lifting carriage 356 in a substantially vertical position. Furthermore, the storage box 357 may be of a size that accommodates all components of the winch and pulley system with additional spare room for accessories such as chains, straps, or harnesses, for example.

A winch motor 363 may be located on the lifting carriage 356. Alternatively, a hand-cranked gearbox may be used instead of the winch motor 363. The gearbox may be driven by a hand crank 302 or a ratcheting wrench 303. In addition to the hand crank 302 or the ratcheting wrench 303, an electric drill, such as a cordless drill, for example, could be inserted into the gearbox and operated to drive the system.

Still alternatively, the gearbox or winch motor 363 may be located in the storage box 357. A cable or cables 362 are shown in use at a first angle A1 or, alternatively, at as second angle A2. When used at the first angle A1, the cable or cables 362 can be used to pull loads in a primarily horizontal direction or up a ramp, for example. When used at the second angle A2, the cable or cables 362 can be used to lift items vertically by placing them over pulley wheels on the lifting carriage 356 or pre-rolling them onto a cable drum 374 situated on the lifting carriage 356. A manually operated boat winch 321 for example, as shown in FIG. 20, located in the storage box 357, could allow for manual operation of the winch and pulley system.

Reinforced bracing 372 may be added to the storage box 357 to allow for pulling a heavy load in the horizontal direction when the winch motor 363 is located on the lifting carriage 356. A slot 373 may be built into the storage box 357 to facilitate horizontal pulling, whether through a lifting carriage 356 or storage box 357 mounted winching mechanism. Other winching configurations may require other configurations of storage box 357 bracing and winching mechanism mounting.

FIG. 24 shows a winch cable 362 or a plurality of winch cables run from a winching mechanism mounted in the bed of a vehicle, for example in the storage box 357, and placed directly over pulleys on the lifting carriage 356. Similarly, FIG. 25 shows a winch cable 362 or a plurality of winch cables run from a bed-mounted winch. However, in this configuration, the winch cable 362 is pre-wound onto a cable drum 374. When the winch cable 362 is initially attached to the drum 374, additional windable load supports 375 are in position P11. As the winch cable 362 is wound around the drum, the additional windable load supports 375 are lowered to position P12.

FIG. 25 also shows a ratcheting wrench 303 and a hand crank 302 that may be used to power a manually operated truck-mounted winch and pulley system. In addition to a hand crank 302 or a ratcheting wrench 303, an electric drill, such as a cordless drill, for example, could be inserted into the gear box and operated to drive the system.

A bed mounted winch and pulley system may be used with an attached device 401 to supply a forward pull to the vehicle, as shown in FIG. 26. Additionally, a winching motor located in the front of the vehicle may be used to drive the winch and pulley system located in the bed of the truck.

Figure 27:
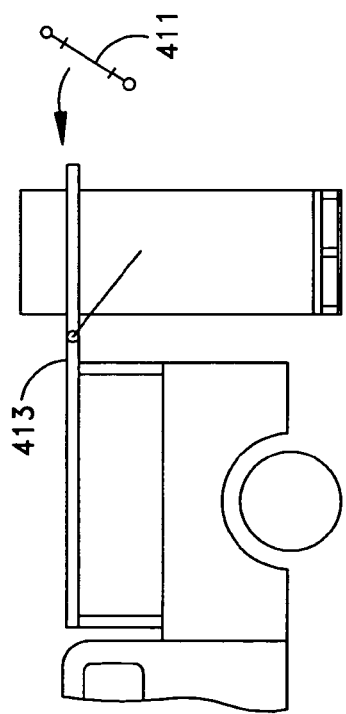
FIG. 27 is a section view showing a small truck being used to move an object that is taller than the lifting tracks on the truck.
Figure 28:
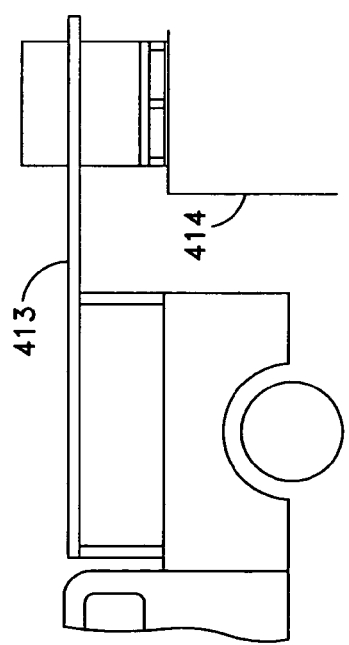
FIG. 28 is a section view showing a small truck loading or unloading on a loading dock.

Objects taller than the lifting tracks 413 may still be moved, as shown in FIG. 27. One support shaft 411 is removed so that an object 412 to be lifted may be positioned between the lifting tracks 413. When the removed support shaft 411 is replaced, the lifting carriage surrounds the object 412 to be lifted. Lifting objects taller than the lifting tracks 413 may be accomplished through the use of a four-pulley system or through the use of two single-shaft lifting units. In addition to lifting objects taller than the lifting tracks 413, objects may be lifted onto or off from a loading dock 414 as shows in FIG. 28.

Figure 29:
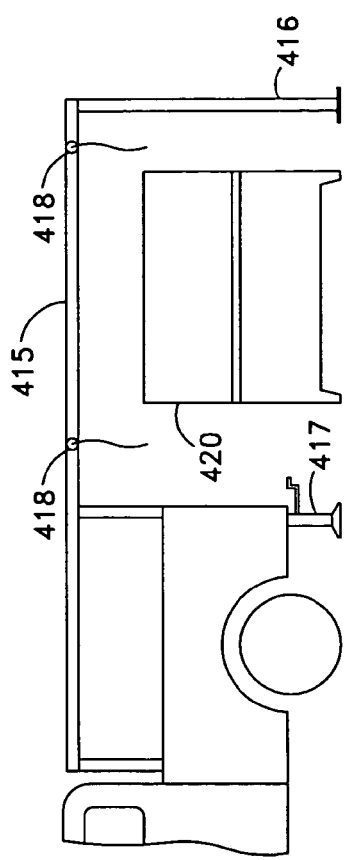
FIG. 29 is a section view showing the small truck with an extended lifting track being used to move a large object.

Extended lifting tracks 415 may be used to lift large objects, as shown in FIG. 29. In this example, single-shaft pulley units 418 are being used to lift a piano 420. Vertical posts 416 support the extended lifting tracks 415. A jack 417 may be used to support the truck bed to prevent compression of the suspension springs during loading or unloading.

Figure 30:
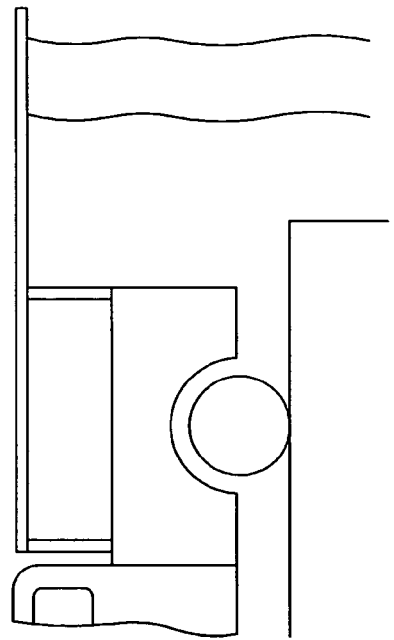
FIG. 30 is a section view showing the small truck unloading cargo to a lower elevation.

The winch and pulley system may be used to lower cargo to an elevation beneath the truck wheels as shown in FIG. 30.

Figure 31:
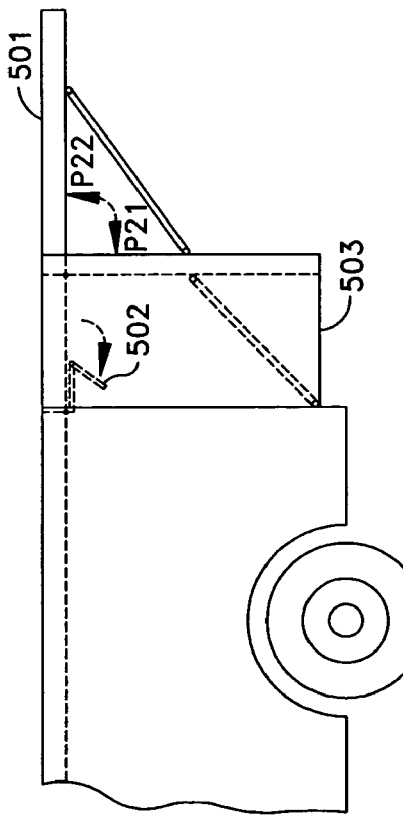
FIG. 31 is a section view showing a cargo van with an extendable track installed for use with a winch and pulley system.

The winch and pulley system may be installed in a cargo van as shown in FIG. 31. In the embodiment shown in this figure, the track extensions 501 may fold out from a vertical storage position P21 to a horizontal operating position P22.

When the system is in use, a latch 502 could keep the van's doors 503, to which the tracks 501 are attached, in proper alignment.

Figure 34:
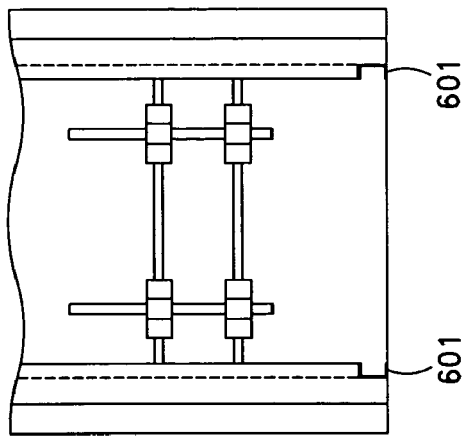
FIG. 34 is an overhead plan view of the vehicle in FIG. 32.
Figure 32:
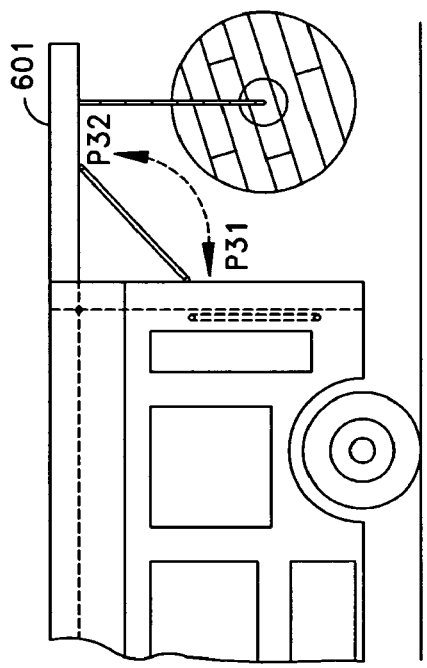
FIG. 32 is a section view of a utility vehicle with an extendable track installed for use with the winch and pulley system.
Figure 33:
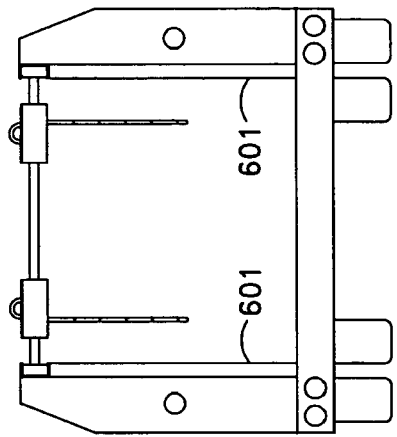
FIG. 33 is an end view of the vehicle shown in FIG. 32.

The winch and pulley system may be installed at the rear of a truck as shown in FIGS. 32 through 34. In the embodiment shown in these figures, the track extensions 601 fold out from the truck from a vertical storage position P31 to a horizontal operating position P32.

A further method of track extension is shown in FIG. 35, in which the track extension 701 is stored within the main track 702.

As shown in FIG. 36, a first truck 703 having the winch and pulley system could be parked back-to-back with a second truck 704 having a similar system. Their tracks could then be coupled so that a lifting carriage 705 and the cargo it supports can be transferred from the first truck 703 to the second truck 704.

Figure 37:
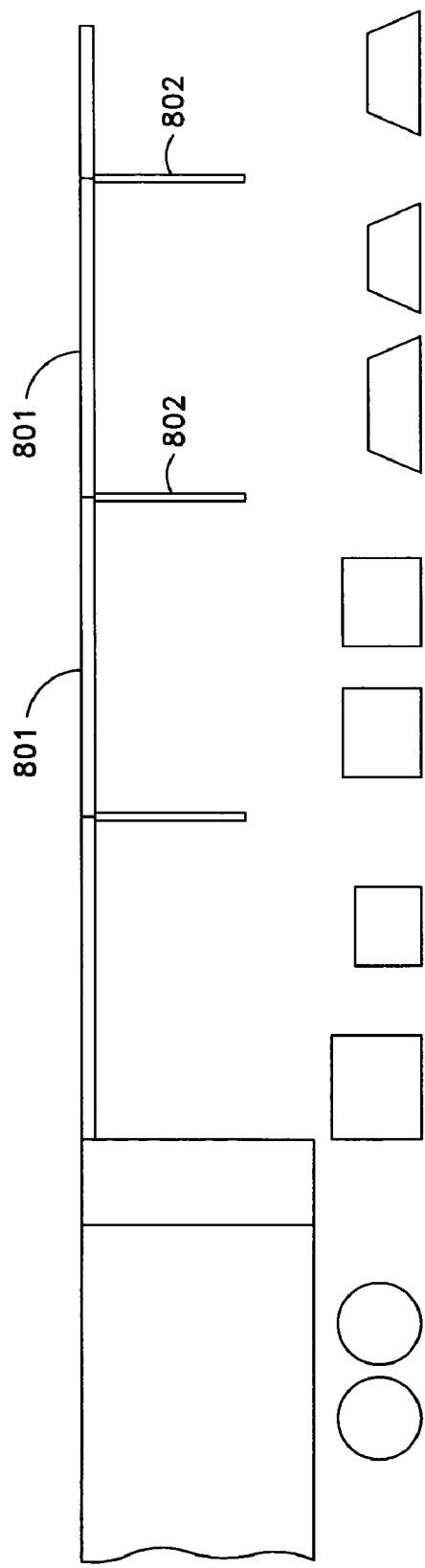
FIG. 37 shows a semi tractor-trailer with an extended track system.
Figure 38:
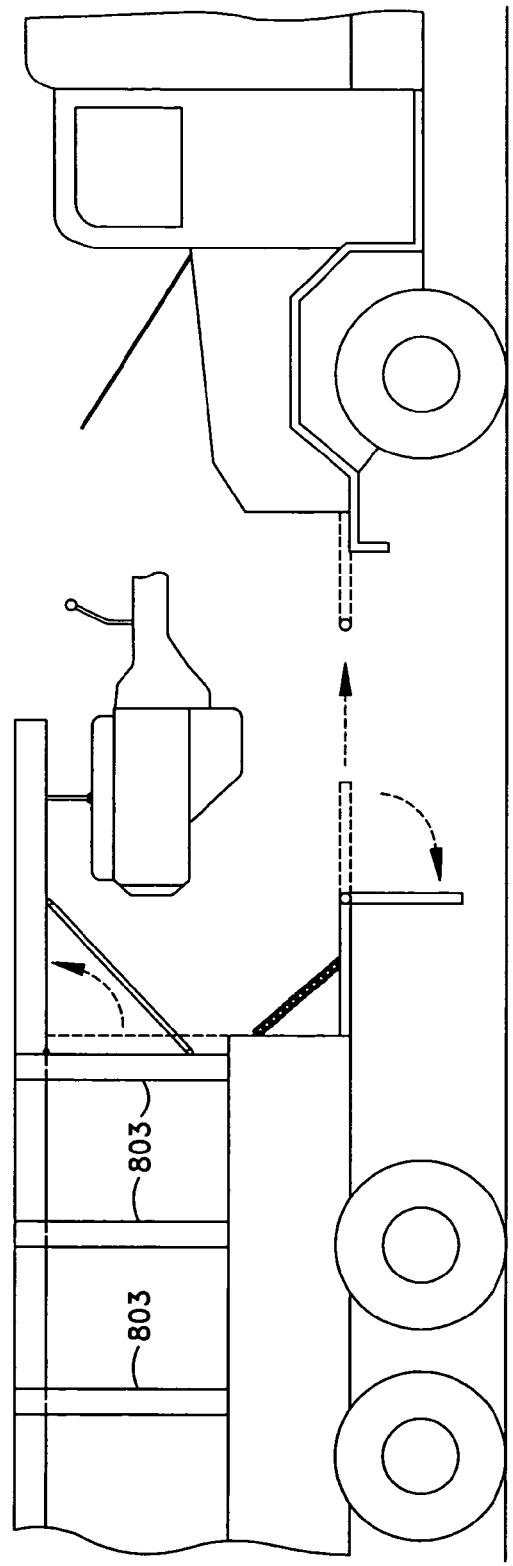
FIG. 38 shows a vehicle delivering a replacement engine and transmission to a second vehicle via the winch and pulley system attached to canvas supporting ribs.

The winch and pulley system could be adapted for use with multiple track extensions 801 and support posts 802 as shown in FIG. 37. Additionally, the system could be mounted to the canvas supporting ribs 803 common to military vehicles as shown in FIG. 38.

Figure 39:
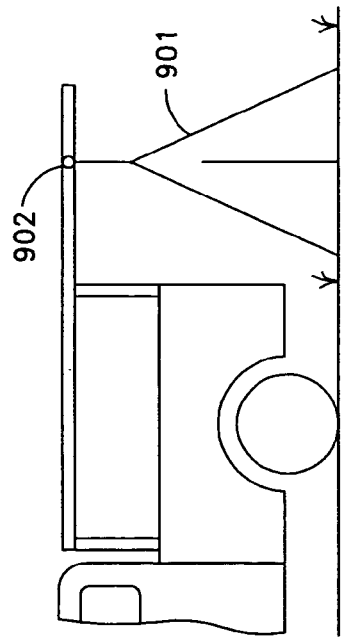
FIG. 39 shows the winch and pulley system mounted to a vehicle and supporting a tent.

A shown in FIG. 39, the system may be configured to support a tent 901. In such a configuration, the tent may be stored in the storage box along with the lifting carriage 902 when not in use, or in a separate storage box dedicated to the tent. When deployed, the lifting carriage 902 could be used to support the top and/or sides of the tent 901.

The mounted winch and pulley system of any of the embodiments described herein could be equipped with servomotors to automatically position the lifting carriage. This would obviate the need to position the lifting carriage by hand. Servomotors responding to a positioning signal could move the lifting carriage in the horizontal plane to a desired location. The positioning signal could be generated by a computer-based control system, such as a personal computer, a programmable logic controller, or other microprocessor-based system, for example. An additional servomotor or servomotors could further control the vertical lifting action of the winch and pulley system.

The invention has been described hereinabove using specific examples; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

What is claimed is:

1. A lifting system, comprising:
   a track; and
   a lifting carriage movable along said track, said lifting carriage including:
      a pulley;
      a drive shaft for turning said pulley;
      a first support shaft;
      a second support shaft;
      a third support shaft; and
      a first slide assembly connecting said first support shaft to said second support shaft at a substantially right angle and which is positionable along said first support shaft and said second support shaft;
      a second slide assembly connecting said drive shaft to said first support shaft, wherein said drive shaft and said first support shaft extend through the slide assembly, and wherein said slide assembly is linearly movable along and relative to said drive shaft and the first support shaft; and
a third slide assembly connecting said third support shaft to said drive shaft at a substantially right angle and which is positionable along said third support shaft and said drive shaft.

2. A lifting system as set forth in claim 1, wherein said second slide assembly connects said drive shaft to said first support shaft at a substantially right angle.

3. A lifting system as set forth in claim 2, further comprising an additional track substantially parallel to said track, wherein said lifting carriage is moveable along said track and said additional track.

4. A lifting system as set forth in claim 3, further comprising a windable support that extends from said pulley and is wound by rotation of said drive shaft.

5. A lifting system as set forth in claim 3, wherein said lifting carriage further comprises:
a fourth slide assembly connecting said second support shaft to said third support shaft at a substantially right angle and which is positionable along said second support shaft and said third support shaft.

6. A lifting system as set forth in claim 5, further comprising a manually driven gearbox for rotating said drive shaft.

7. A lifting system as set forth in claim 5, further comprising a motor for rotating the drive shaft.

8. A lifting system as set forth in claim 5, wherein said pulley is a first driven pulley and is connected to said third slide assembly and wherein said lifting carriage further comprises:
a second driven pulley connected to said second slide assembly;
a first support pulley connected to said first slide assembly;
a second support pulley connected to said fourth slide assembly;
a first windable support which extends between said drive shaft and said first support pulley and which is windable around said drive shaft, and
a second windable support which extends between said drive shaft and said second support pulley and which is windable around said drive shaft, wherein said drive shaft passes through said first driven pulley and said second driven pulley.

9. A lifting system as set forth in claim 5, wherein said pulley is a driven pulley that is turned by said drive shaft.

10. A lifting system as set forth in claim 9, further comprising:
a second pulley, and
a windable support which extends from said lifting carriage and which is wound by rotation of said drive shaft.

11. A lifting system as set forth in claim 10, wherein said first support shaft, said second support shaft, and said third support shaft are each comprised of square metal tubing.

12. A lifting system as set forth in claim 10, wherein said driven pulley is comprised of an inner section which engages said drive shaft and an outer section which surrounds said inner section and is removable from said inner section.

13. A lifting system as set forth in claim 10, wherein said system is installed on a motor vehicle.

14. A lifting system as set forth in claim 13, further comprising,
a first track extension which extends from said track beyond the vehicle; and
a second track extension which extends from said additional track beyond the vehicle.

15. A lifting system, comprising:
a drive shaft;
a support shaft;
a first spacing shaft;
a second spacing shaft;
a first slide assembly for connecting said support shaft to said first spacing shaft, wherein the first slide assembly is linearly positionable along and relative to said first spacing shaft;
a second slide assembly for connecting said support shaft to said second spacing shaft, wherein the second slide assembly is linearly positionable along and relative to said second spacing shaft;
a third slide assembly for connecting said drive shaft to said second spacing shaft, wherein the third slide assembly is linearly positionable along and relative to said second spacing shaft;
a fourth slide assembly for connecting said drive shaft to said first spacing shaft, wherein the fourth slide assembly is linearly positionable along and relative to said first spacing shaft;
a driven pulley linearly positionable along and relative to said drive shaft wherein said drive shaft causes said driven pulley to rotate;
a support pulley linearly positionable along and relative to said support shaft; and
a windable support which extends between said driven pulley and said support pulley.

16. A lifting system mounted on a vehicle, comprising:
a first track movable from a stowed position to a deployed position on the vehicle;
a second track movable from a stowed position to a deployed position on the vehicle; and
a lifting carriage linearly movable on and relative to said first track and said second track, said lifting carriage including:
a first support shaft;
a second support shaft;
a third support shaft;
a first slide assembly connecting said first support shaft to said second support shaft at a substantially right angle, wherein said slide assembly is linearly movable along and relative to said first support shaft and said second support shaft;
a second slide assembly connecting said drive shaft to said first support shaft, wherein said drive shaft and said first support shaft extend through the slide assembly, and wherein said slide assembly is linearly movable along and relative to said drive shaft and the first support shaft; and
a third slide assembly connecting said third support shaft to said drive shaft at a substantially right angle and which is positionable along said third support shaft and said drive shaft.

17. A lifting system as set forth in claim 16, further comprising:
a winch, and
a windable support extending from said winch to said lifting carriage.

18. A lifting system as set forth in claim 17, wherein said winch is manually driven.

19. A lifting system as set forth in claim 17, wherein said winch is driven by a motor.

20. A lifting system as set forth in claim 17, further comprising:
a first track extension which extends from said first track; and a second track extension which extends from said second track.

21. A lifting system as set forth in claim 20, further comprising a storage unit for storing a portion of said lifting carriage.

22. A lifting system as set forth in claim 21, further comprising a tent connected to said lifting carriage.

23. A lifting system as set forth in claim 22, wherein the vehicle includes a bed and further wherein a storage box is mounted to said bed and the tent is stored in the storage box.

24. A lifting system as set forth in claim 17, wherein the vehicle includes a bed and further wherein the winch is mounted to said bed.

25. A lifting system as set forth in claim 16, wherein said vehicle is a pickup truck, the lifting system further comprising:
   a vertically movable first pickup truck bed rail, wherein said first track is attached to the first pickup truck bed rail; and
   a vertically movable second pickup truck bed rail, wherein said second track is attached to the second pickup truck bed rail.

26. A lifting system as set forth in claim 16, wherein the lifting system is mounted to a plurality of supporting ribs located on the vehicle.

27. A lifting system, comprising:
   a first track;
   a second track substantially parallel to the first track; and
   a lifting carriage including a plurality of wheels that roll on said tracks, wherein the lifting carriage is linearly movable relative to said tracks, said lifting carriage including:
      a first driven pulley;
      a second driven pulley;
      a drive shaft for turning said driven pulleys, wherein the drive shaft extends through said driven pulleys;
      a first support pulley;
      a second support pulley;
      a first support shaft;
      a second support shaft;
      a third support shaft;
      a first slide assembly connecting said first support shaft to said second support shaft at a substantially right angle, wherein said first support shaft and said second support shaft extend through the first slide assembly, and wherein said first slide assembly is linearly movable along and relative to said first support shaft and said second support shaft, and wherein the first slide assembly includes a first plurality of slide locks for preventing relative movement along said first support shaft and said second support shaft;
      a second slide assembly connecting said second support shaft to said third support shaft at a substantially right angle, wherein said second support shaft and said third support shaft extend through the second slide assembly, and wherein said second slide assembly is linearly movable along and relative to said second support shaft and said third support shaft, and wherein the second slide assembly includes a second plurality of slide locks for preventing relative movement along said second support shaft and said third support shaft;
      a third slide assembly connecting said third support shaft to said drive shaft at a substantially right angle, wherein said third support shaft and said drive shaft extend through the third slide assembly, and wherein said third slide assembly is linearly movable along and relative to said third support shaft and said drive shaft, and wherein the third slide assembly includes a third plurality of slide locks for preventing relative movement along said third support shaft and said drive shaft;
      a fourth slide assembly connecting said drive shaft to said first support shaft at a substantially right angle, wherein said drive shaft and said first support shaft extend through the fourth slide assembly, and wherein said fourth slide assembly is linearly movable along and relative to said drive shaft and the first support shaft, and wherein the fourth slide assembly includes a fourth plurality of slide locks for preventing relative movement along said drive shaft and said first support shaft;
   a motor for rotating the drive shaft;
   a first winching cable extending from the second driven pulley; and
   a second winching cable extending from the first driven pulley,
   wherein the first support pulley is connected to the first slide assembly, the second support pulley is connected to the second slide assembly, the first driven pulley is connected to the third slide assembly, and the second driven pulley is connected to the fourth slide assembly.

* * * * *